(12) United States Patent
Farnan

(10) Patent No.: US 9,195,008 B2
(45) Date of Patent: Nov. 24, 2015

(54) EXPANDED BEAM OPTICAL CONNECTOR AND METHOD OF MAKING THE SAME

(71) Applicant: Winchester Electronics Corporation, Wallingford, CT (US)

(72) Inventor: Jerome C Farnan, Franklin, MA (US)

(73) Assignee: Winchester Electronics Corporation, Middlebury, CT (US)

( * ) Notice: Subject to any disclaimer, the term of this patent is extended or adjusted under 35 U.S.C. 154(b) by 64 days.

(21) Appl. No.: 13/777,634

(22) Filed: Feb. 26, 2013

(65) Prior Publication Data

US 2014/0241664 A1   Aug. 28, 2014

(51) Int. Cl.
    G02B 6/32   (2006.01)
    G02B 6/38   (2006.01)

(52) U.S. Cl.
    CPC ............ G02B 6/32 (2013.01); G02B 6/3853 (2013.01); G02B 6/3875 (2013.01); G02B 6/3877 (2013.01)

(58) Field of Classification Search
    CPC ... G02B 6/3875; G02B 6/3853; G02B 6/3877
    See application file for complete search history.

(56) References Cited

U.S. PATENT DOCUMENTS

| | | | |
|---|---|---|---|
| 3,117,193 A | | 1/1964 | Hirshfield et al. |
| 4,304,461 A | * | 12/1981 | Stewart et al. ............. 385/74 |
| 4,531,810 A | * | 7/1985 | Carlsen ................. 385/137 |
| 4,563,057 A | * | 1/1986 | Ludman et al. ............ 385/74 |
| 4,781,431 A | | 11/1988 | Wesson et al. |
| 4,834,494 A | * | 5/1989 | DeMeritt et al. ........... 385/61 |
| 4,889,406 A | * | 12/1989 | Sezerman ................. 385/35 |
| 5,210,815 A | * | 5/1993 | Alexander et al. .......... 385/138 |
| 5,384,874 A | * | 1/1995 | Hirai et al. ............... 385/34 |
| 5,535,294 A | | 7/1996 | Kamuz et al. |
| 5,542,013 A | | 7/1996 | Kaplow et al. |
| 5,642,446 A | | 6/1997 | Tsai |
| 5,828,804 A | | 10/1998 | Akins |
| 5,999,669 A | | 12/1999 | Pan et al. |
| 6,045,378 A | | 4/2000 | Follingstad |
| 6,535,663 B1 | | 3/2003 | Cherktow |
| 6,599,023 B2 | * | 7/2003 | Yu et al. ................. 385/73 |
| 6,702,476 B2 | * | 3/2004 | Bergmann et al. ........... 385/55 |
| 6,804,435 B2 | * | 10/2004 | Robilliard et al. ........... 385/33 |
| 7,031,567 B2 | * | 4/2006 | Grinderslev et al. .......... 385/34 |
| 7,121,735 B2 | * | 10/2006 | Jitsuno et al. .............. 385/79 |
| 7,231,115 B2 | * | 6/2007 | Seto et al. ............... 385/33 |
| 7,245,799 B2 | | 7/2007 | Shull et al. |
| 7,343,068 B2 | * | 3/2008 | Shigenaga et al. ........... 385/33 |
| 7,371,014 B2 | | 5/2008 | Willis et al. |
| 7,563,034 B2 | * | 7/2009 | Chen et al. ............... 385/66 |
| 7,775,725 B2 | | 8/2010 | Grinderslev |

(Continued)

OTHER PUBLICATIONS

King's Electronics Co., Inc., "Video Jack Single Circuit", dated Jun. 1, 2004, 1 page.

*Primary Examiner* — Rhonda Peace

(74) *Attorney, Agent, or Firm* — Rothwell, Figg, Ernst & Manbeck, P.C.

(57) ABSTRACT

An expanded beam (EB) optical connector. In some embodiments, the EB optical connector includes: a rigid, hollow, straight contact tube having a centerline axis; and a collimator assembly having an optical axis and comprising an optical fiber and a collimating lens, wherein the centerline axis of the contact tube is at least substantially aligned with the optical axis such that collimated light produced by the lens from light exiting the fiber travels though the contact tube and the loss of light caused by misalignment of the axes is not more than 2 dB.

16 Claims, 16 Drawing Sheets

(56) References Cited

U.S. PATENT DOCUMENTS

| | | | |
|---|---|---|---|
| 7,986,861 B2* | 7/2011 | Shimotsu | 385/33 |
| 8,182,159 B2* | 5/2012 | Tanaka | 385/74 |
| 8,406,583 B2 | 3/2013 | Farnan | |
| 8,419,622 B2* | 4/2013 | Shimotsu | 600/132 |
| 8,827,567 B2* | 9/2014 | Grinderslev | 385/53 |
| 2003/0012545 A1* | 1/2003 | Bellman et al. | 385/140 |
| 2003/0103725 A1* | 6/2003 | Li | 385/34 |
| 2003/0206696 A1* | 11/2003 | Gerber et al. | 385/33 |
| 2004/0091202 A1 | 5/2004 | Ji et al. | |
| 2005/0123240 A1* | 6/2005 | Seto et al. | 385/35 |
| 2005/0238293 A1* | 10/2005 | Jitsuno et al. | 385/79 |
| 2006/0177182 A1* | 8/2006 | Mine et al. | 385/74 |
| 2006/0239611 A1* | 10/2006 | Tanaka et al. | 385/33 |
| 2007/0147733 A1* | 6/2007 | Matsumura et al. | 385/34 |
| 2010/0027943 A1* | 2/2010 | Armani et al. | 385/74 |
| 2013/0322821 A1* | 12/2013 | Grinderslev | 385/33 |
| 2014/0241664 A1* | 8/2014 | Farnan | 385/33 |

\* cited by examiner

EXPANDED BEAM OPTICAL CONNECTOR AND METHOD OF MAKING THE SAME

TECHNICAL FIELD

This disclosure relates to an expanded beam optical connector and a method of making an expanded beam optical connector.

BACKGROUND

Connectors that are used to align two optical fibers are commonly referred to as optical connectors. The vast majority optical connectors are of the "physical contact (PC)" type, and are referred to as PC optical connectors. In a PC optical connector that is used to connect to fibers the two fibers are physically touching under pressure. For single mode fibers, the glass optical core of the fiber has to be aligned extremely accurately to ensure a low loss connection. The core of the fiber is generally between 6 and 100 microns, with 9-10 micron core fiber being almost universally used for telecommunications. This small core means that a scratch or dust on a fiber will cause the light to be greatly attenuated and for the communication link to be lost.

Another type of optical connector is the "expanded beam (EB)" optical connector. An EB optical connector eliminates (or reduces) the effect of dust contamination or scratches by using a pair of lenses 101, 102 to focus the light between the two fibers 104, 105, as illustrated in FIG. 1. Expanded beam connectors commonly use ball lenses in a metal block with steel alignment pins to ensure the light is focused back into the fiber without significant loss. These implementations rely on the accuracy of the machining of this block, the pins, the lens and the fiber ferrule in order to provide a reasonably low optical insertion loss.

What is desired is an improved EB optical connector.

SUMMARY

This disclosure describes embodiments of an improved EB optical connector and methods for making the same.

In some embodiments, the improved EB optical connector comprises: a rigid, hollow, straight contact tube having a centerline axis; and a collimator assembly having an optical axis and comprising an optical fiber and a collimating lens, wherein the centerline axis of the contact tube is at least substantially aligned with the optical axis such that collimated light produced by the lens from light exiting the fiber travels though the contact tube and the loss of light caused by misalignment of the axes is not more than about 2 dB. In some embodiments, the lens is positioned between an end of the contact tube and an end of the optical fiber. In some embodiments, the loss of light caused by misalignment of the axes is not more than 1.5 dB. In some embodiments, the loss of light caused by misalignment of the axes is not more than 1.2 dB.

In other embodiments, the EB optical conectro comprises a rigid, hollow contact tube holder; a rigid, hollow contact tube having a first end attached to a first end portion of the contact tube holder; and a collimator assembly comprising a lens, an optical fiber and a lens holder, wherein at least a portion of the lens and at least a portion of optical fiber are housed in the lens holder, at least a portion of the lens holder is positioned in a cavity formed by a second end portion of the contact tube holder, the lens holder is adhesively fastened to the contact tube holder, and an optical axis of the collimator is aligned with an axis of the contact tube. In some embodiments, the contact tube is integrally attached to the contact tube holder.

In some embodiments, the contact tube is integrally attached to the contact tube holder (e.g., the contact tube and contact tube holder are machined from a single object).

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
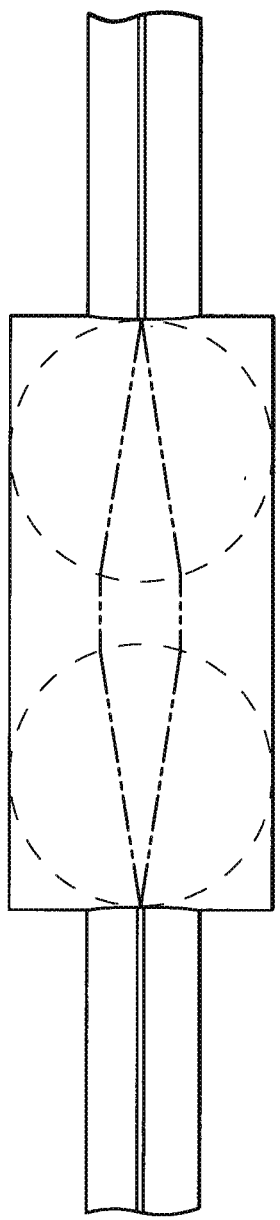
FIG. 1 illustrates components of a typical EB optical connector.
Figure 2:
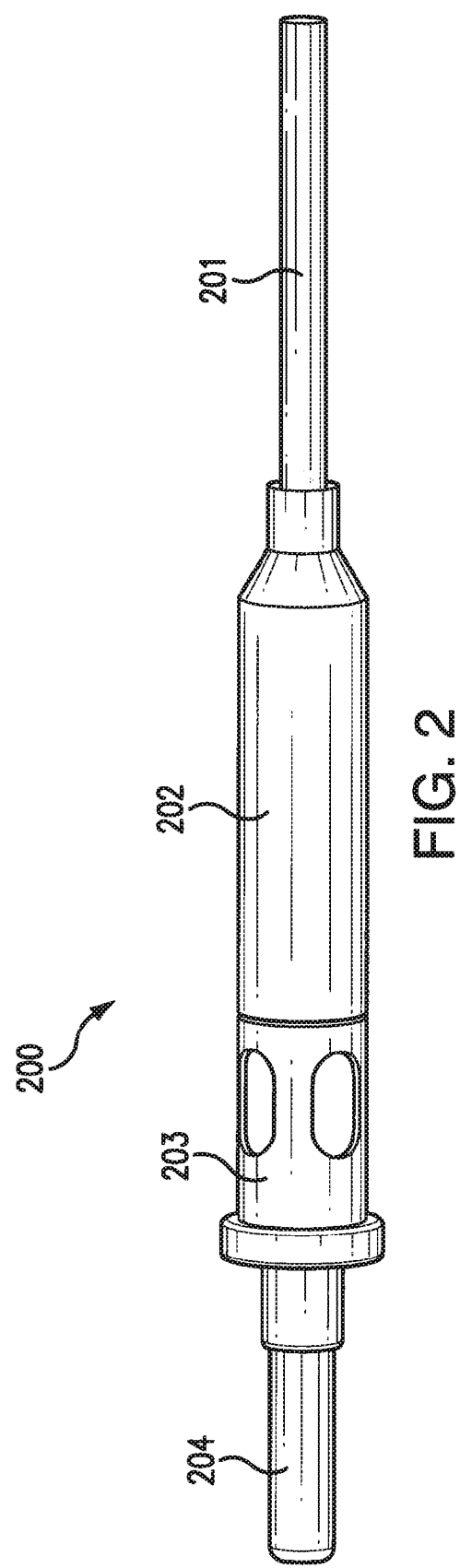
FIG. 2 is a drawing illustrating an improved EB optical connector according to some embodiments.

FIG. 2 is a drawing illustrating an improved EB optical connector 200 (or "EB connector 200" for short) according to some embodiments. As shown in FIG. 2, EB connector 200 includes: (1) a protective rigid sleeve 202 that protects, among other things, a portion of an optical fiber 201, (2) a rigid, hollow contact tube holder 203, and (3) a rigid, hollow contact tube 204. Contact tube holder 203 may be generally cylindrical in shape, hollow, and open at both its distal 393 and proximal 394 ends. In some embodiments, contact tube 204 has a length between 0.5 millimeters (mm) and 100 mm. In some embodiments, the length is between 5 and 25 mm. In other embodiments, the length is around 12 mm. In some embodiments, the inner diameter (ID) of contact tube 204 is about 0.8 mm and the outer diameter (OD) of contact tube 204 is about 1.25 mm. In other embodiments, the ID of contact tube 204 ranges between 0.1 mm and 10 mm, and the OD of contact tube 204 ranges between 0.15 mm and 15 mm.

Figure 3:
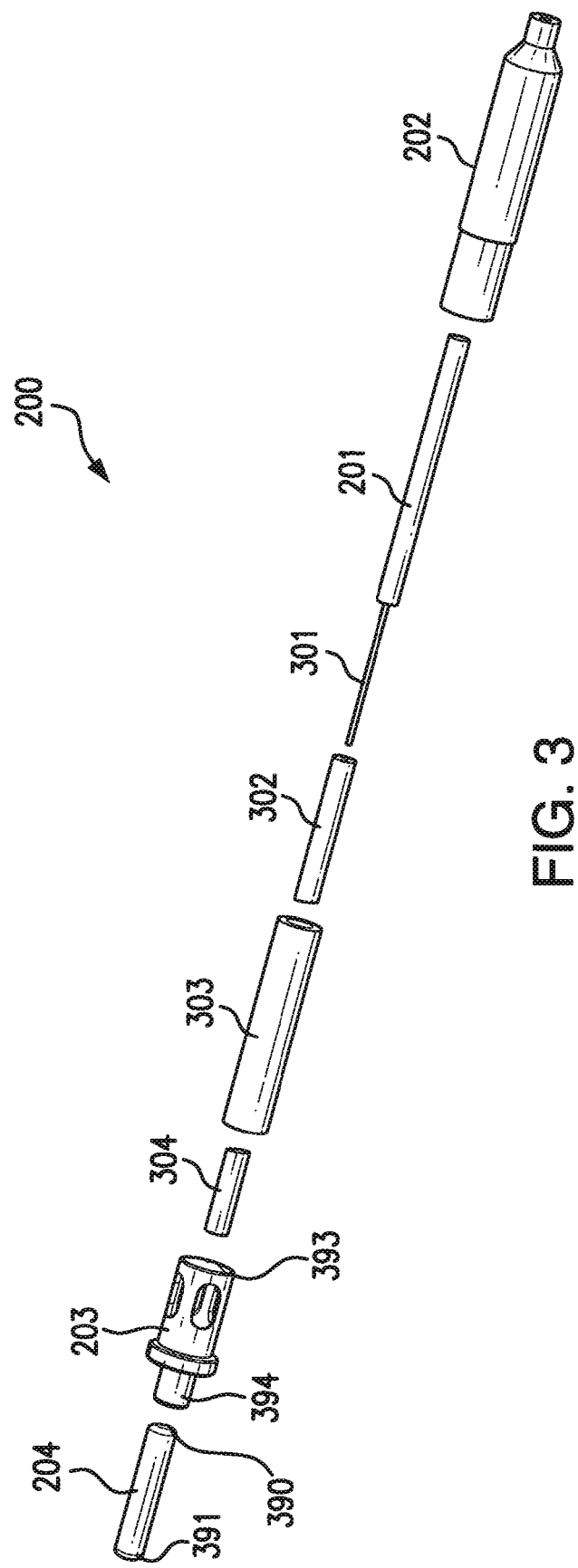
FIG. 3 is an exploded view of the improved EB optical connector.
Figure 4:
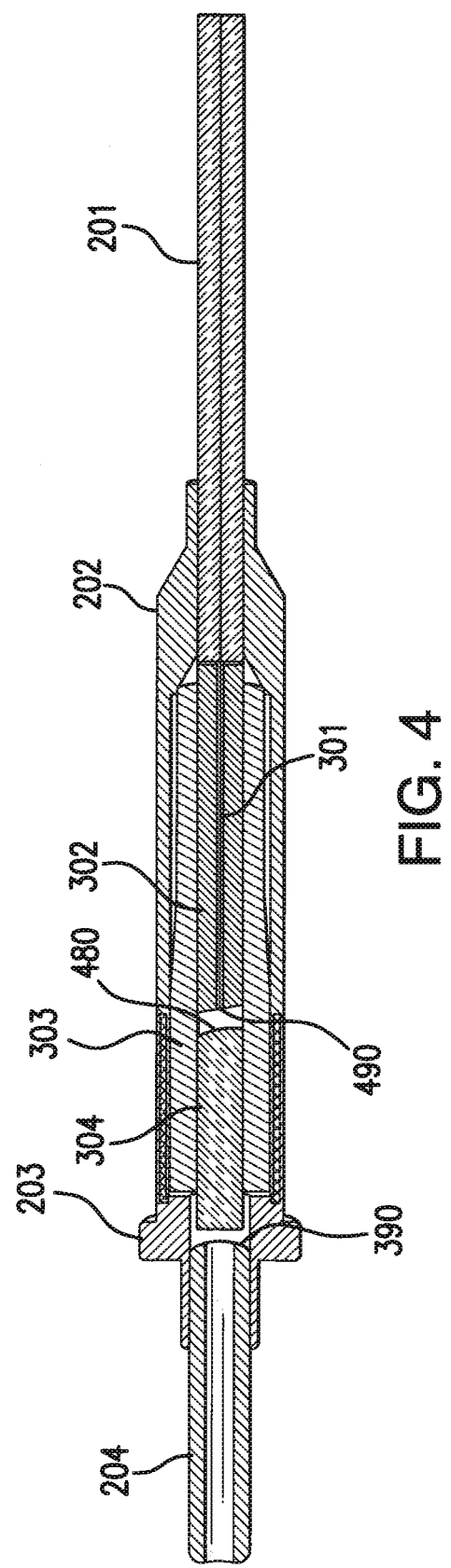
FIG. 4 is a cross-sectional view of the improved EP optical connector.
Figure 5:
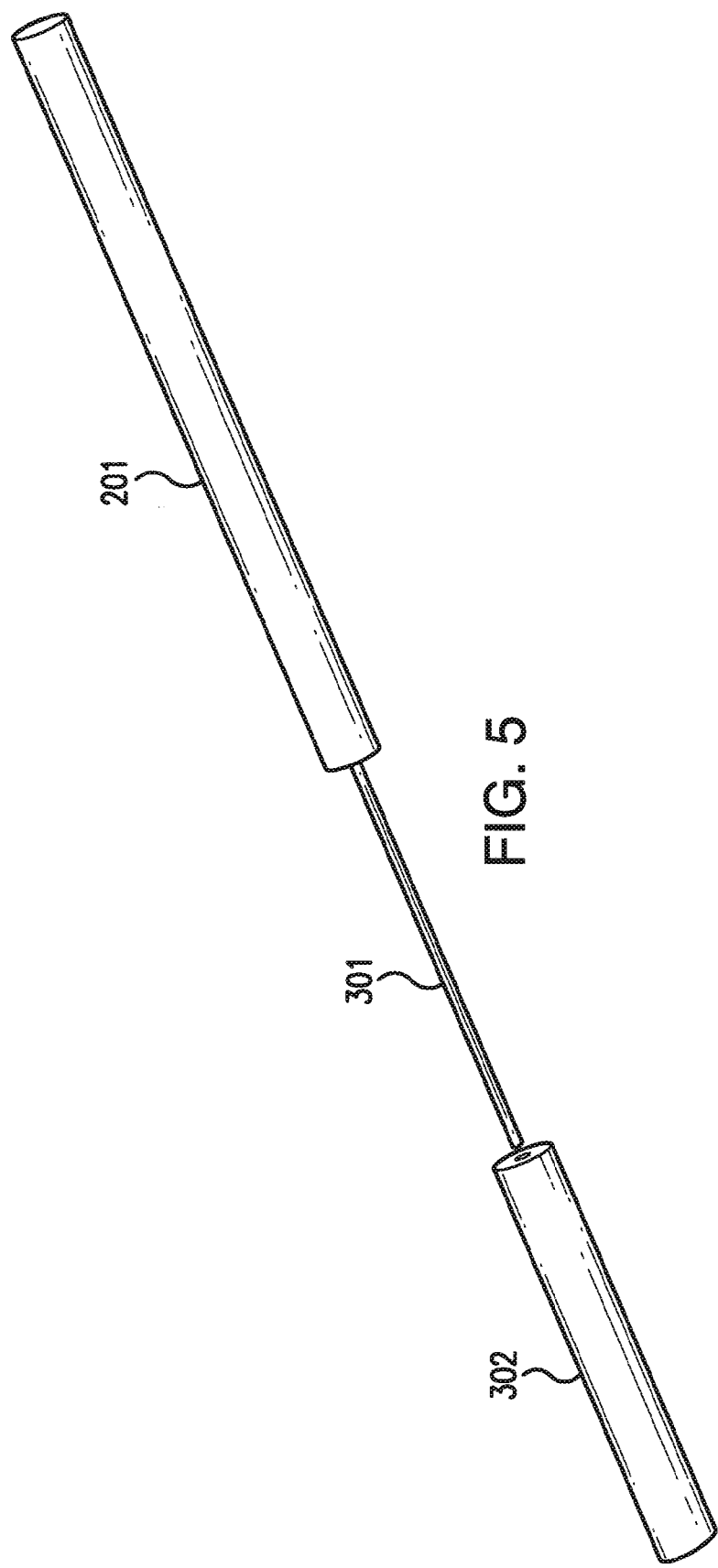
FIG. 5-13 illustrates various steps in a process of making the improved EP optical connector.
Figure 6:
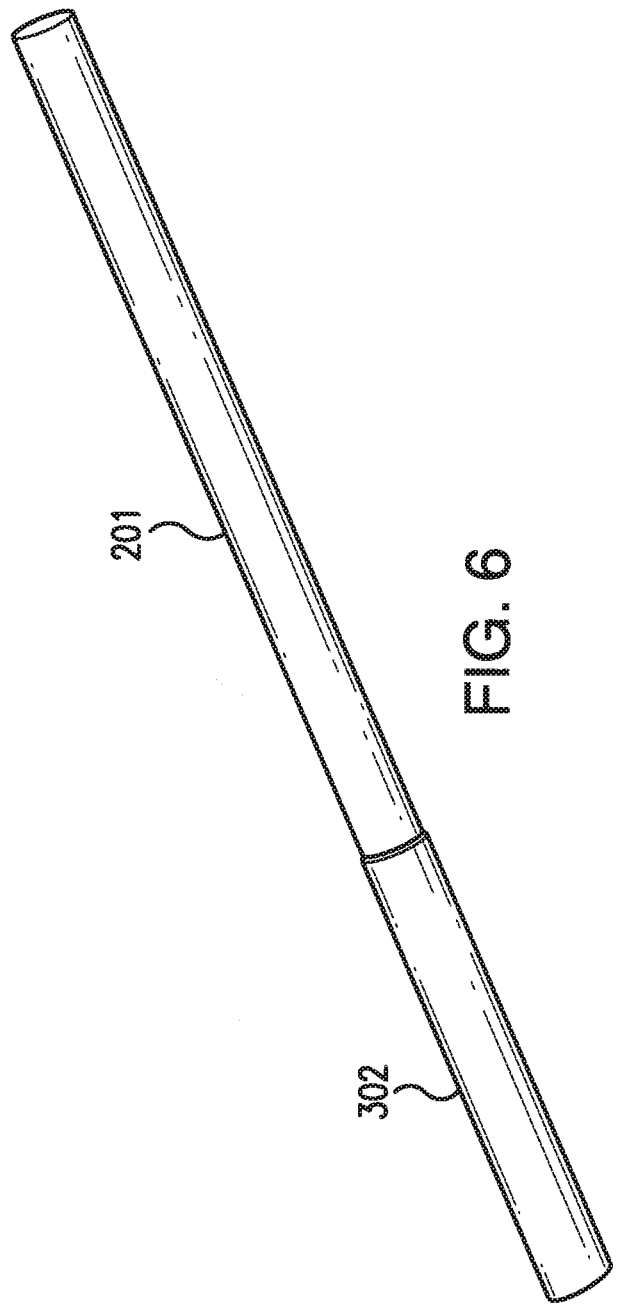
Figure 7:
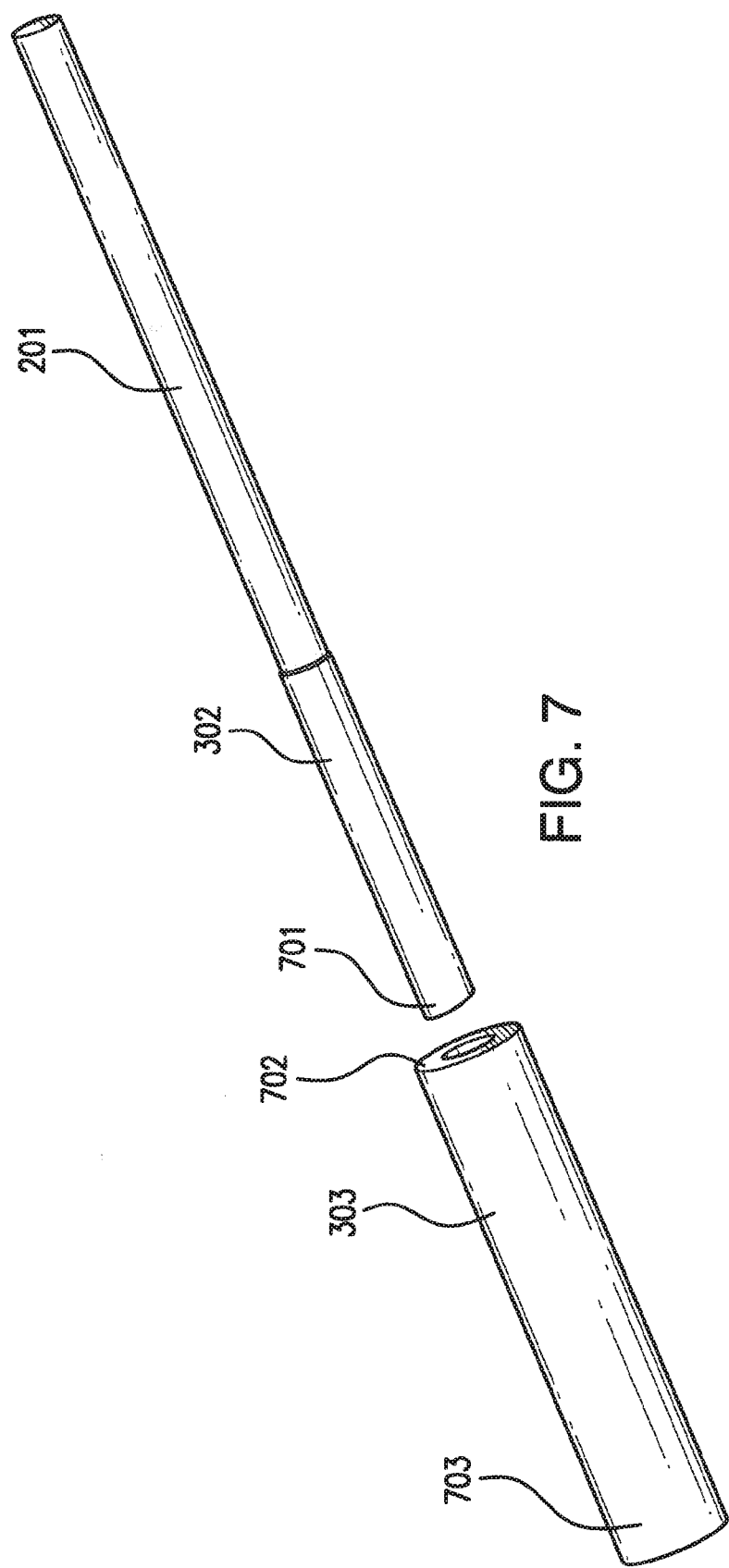
Figure 8:
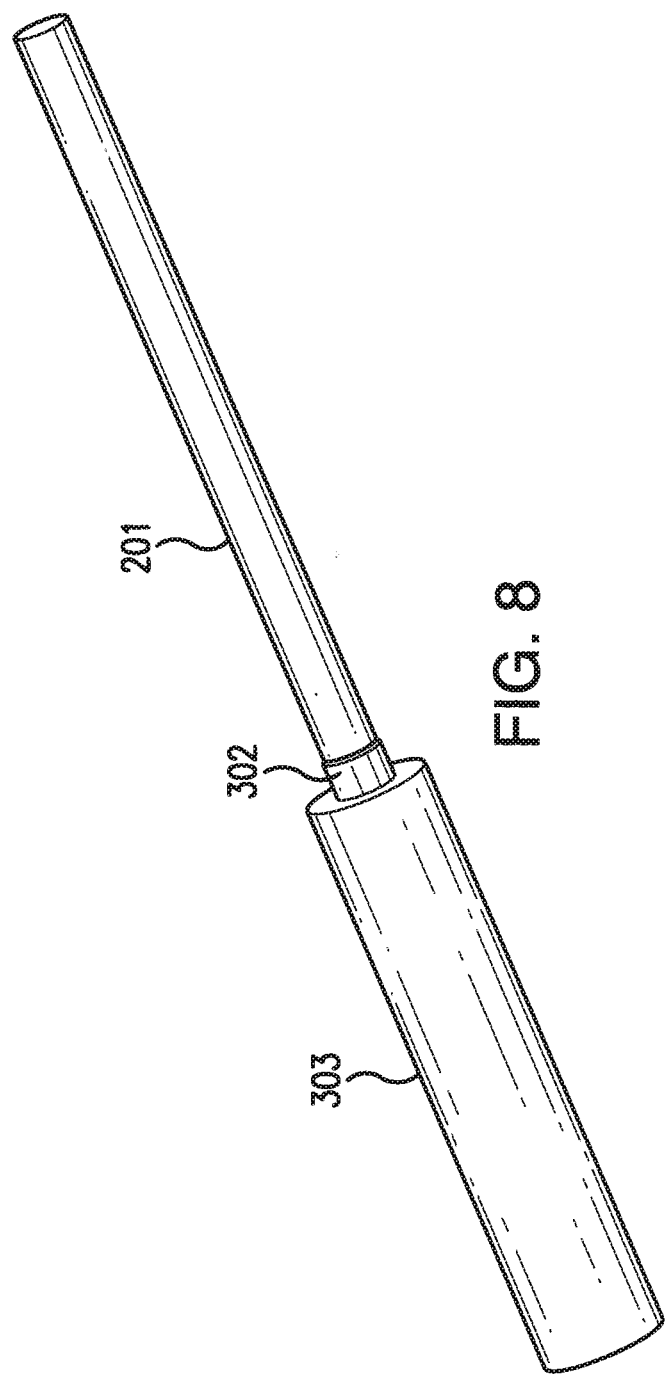
Figure 9:
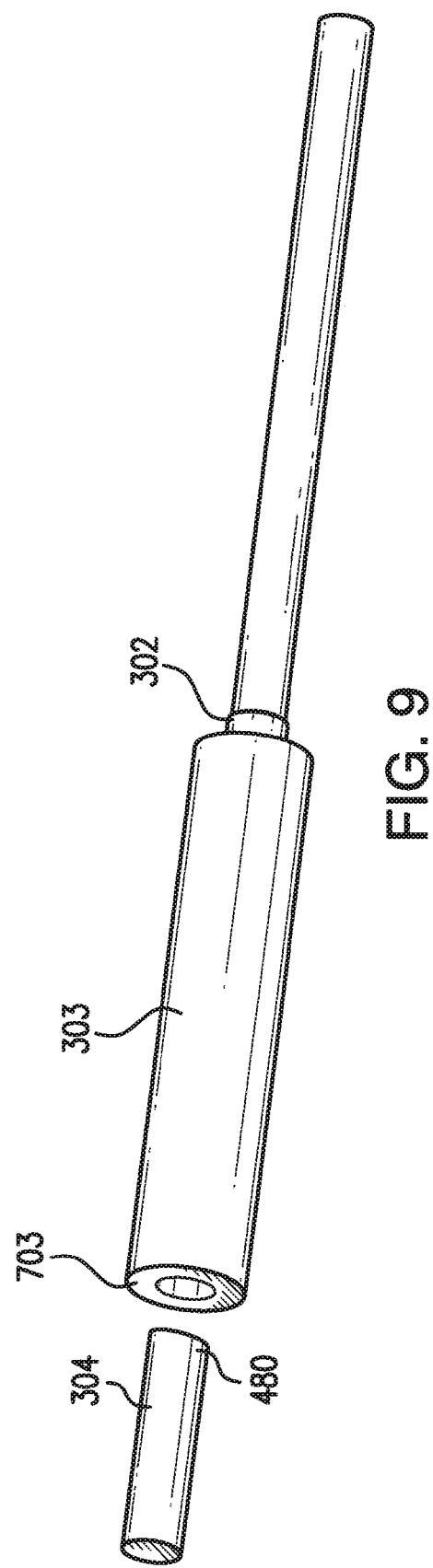
Figure 10:
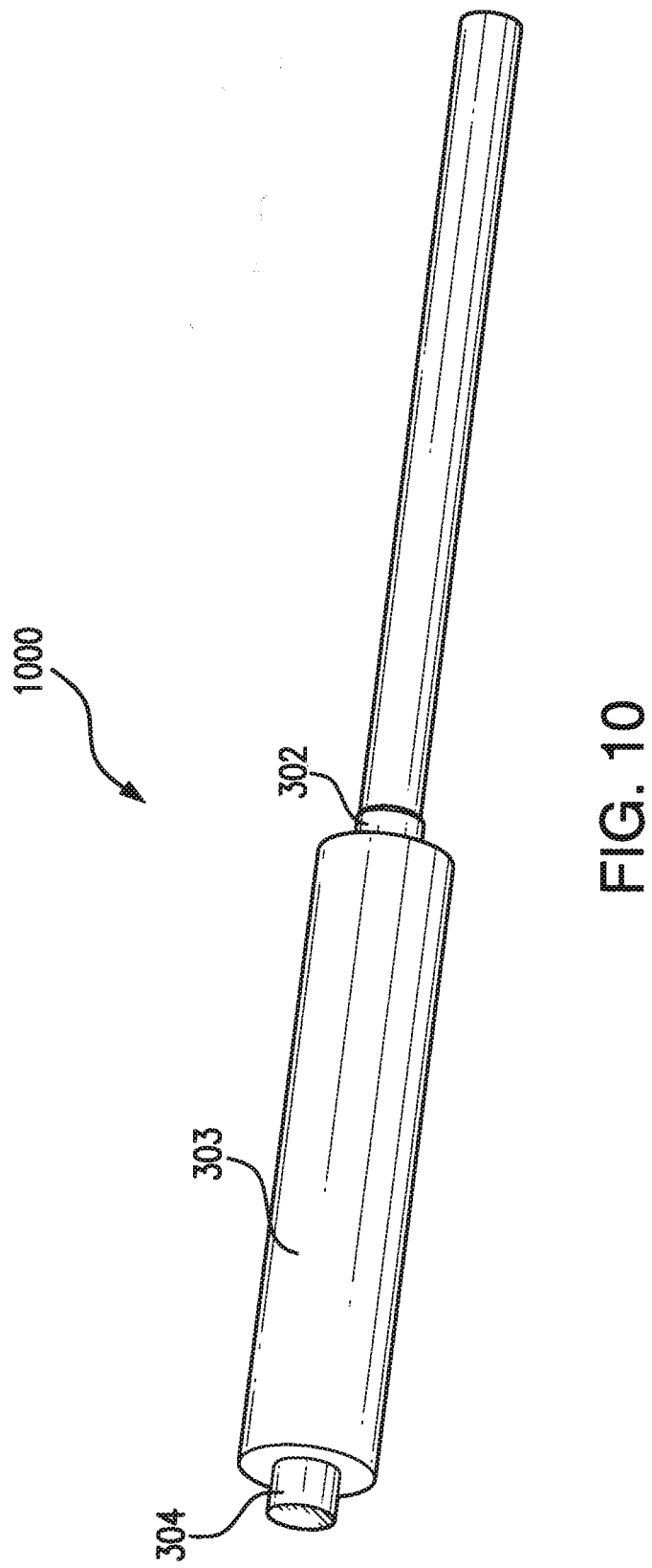

FIG. 3 is an exploded view of EB connector 200. As shown in FIG. 3, EB connector 200 may further include: a rigid sleeve (a.k.a, ferrule) 302 that serves to, among other things, protect an exposed glass strand 301 of fiber cable 201, a lens holder 303, and a lens 304. FIG. 4 is a cross-sectional view of the improved EP optical connector. As shown in FIG. 4, lens 304 is positioned between proximal end 390 of contact tube 204 and distal end 490 of strand 301. As further shown, proximal end 480 of lens and distal end of ferrule 302 may be angled with respect to the transverse axis of the connector. As further shown, because lens need not be positioned within contact tube 204, the width of lens 304 may be greater than the internal width of contact tube 204. For instance the OD of lens 304 may be about 1.8 millimeters and the ID of contact tube 204 is less than 1.8 mm (e.g., as mentioned above, the ID of contact tube 204 may be about 0.8 mm, in some embodiments).

While contact tube 204 and contact tube holder 203 are shown as two separate pieces, in some embodiments contact tube 204 is integrally attached to contact tube holder 203. For example, in some embodiments contact tube 204 and contact tube holder 203 are machined from a single, unitary object In the embodiment shown, lens holder 303 is a tube (e.g., a glass tube) open at both ends, and lens 304 is generally cylindrical in shape and having a diameter (or width) in the range of 0.5 millimeters to 2.0 millimeters. In some embodiments, lens 304 is a gradient-index (GRIN) lens (e.g., a GRIN cylindrical lens). In other embodiments, lens 304 may be a ball lens (e.g., a 3 mm ball lens).

Referring now to FIGS. 5-13, a process of making EB connector 200 will be described. The process may begin by inserting glass strand 301 into ferrule 302 as pictured in FIGS. 5 and 6. Strand 301 and ferrule 302 may be polished to provide a smooth surface and may also be optically coated with an antireflective coating. Additionally, the strand 301, ferrule 302, and lens 304 may be polished at an angle to reduce reflections. For example, proximal end of lens 304 may be angled with respect to the optical axis at least 8 degrees.

The next steps may include inserting distal end 701 of ferrule 302 into end 702 of lens holder 303 and inserting proximal end 480 of lens 304 into the other end 703 of lens holder 303, as pictured in FIGS. 7-10. The resulting assembly 1000 is referred to as a "collimator assembly 1000."

Figure 11:
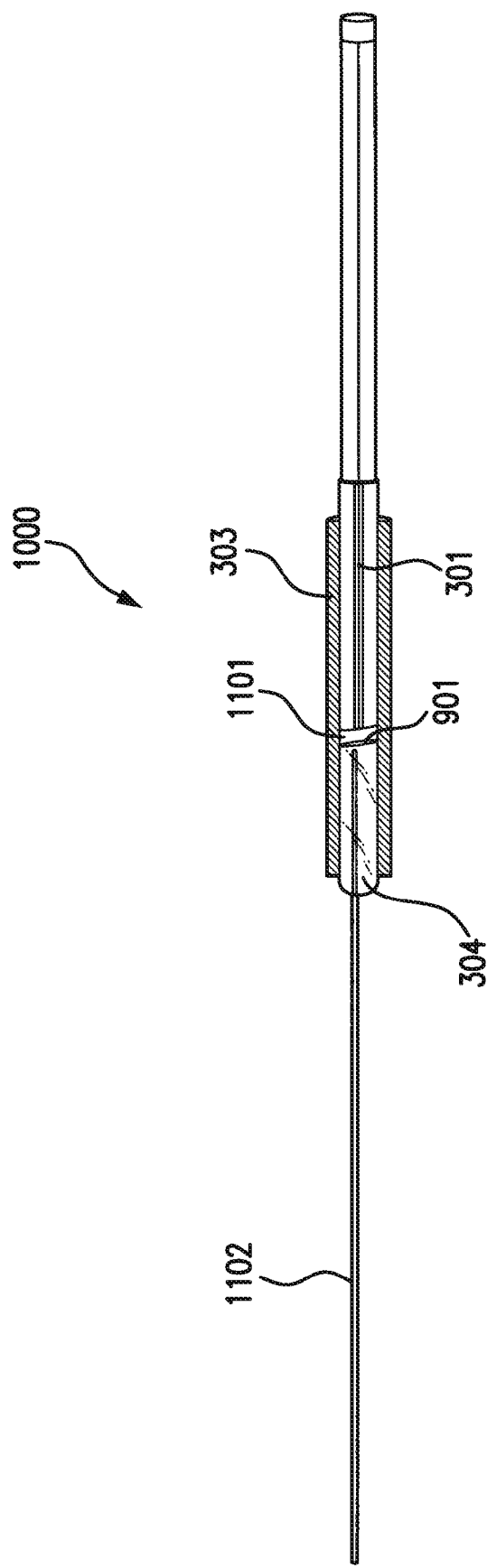
Figure 12:
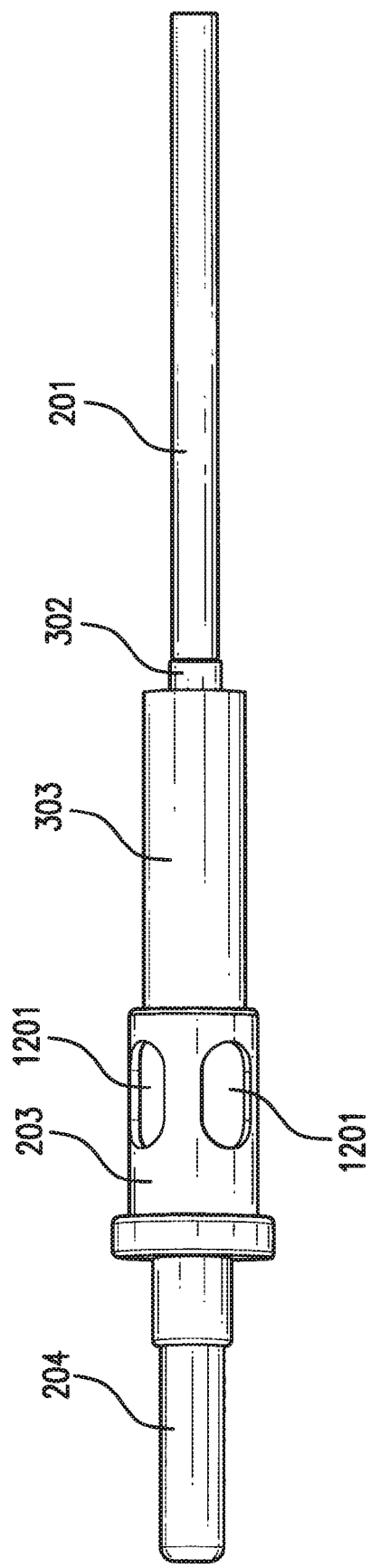
Figure 13:
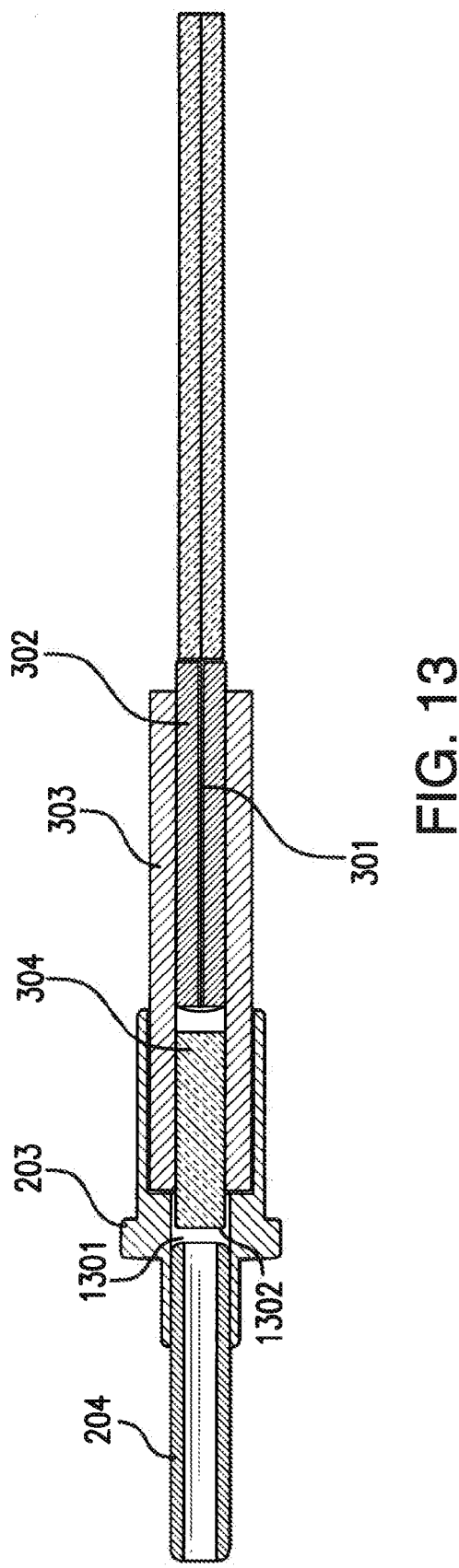

FIG. 11 is a cross-sectional view of the collimator assembly 1000. As illustrated in FIG. 11, at least a portion of lens 304 and at least a portion of ferrule 302 are housed in the cavity of lens holder 303. As also shown, there is a free space 1101 between the distal end of ferrule 302 and proximal end 480 of lens 304. The distance between the distal end of ferrule 302 and proximal end 480 of lens 304 may be about 0.01 mm to 0.2 mm or in some embodiments from 0 to 10 mm. FIG. 11 also illustrates the optical axis 1102 of collimator assembly 1000 (i.e., FIG. 11 illustrates the path that light exiting fiber strand 301 and passing through lens 304 will follow if unimpeded).

The next steps include: (a) inserting proximal end 390 of contact tube 204 into the distal end 393 of contact tube holder 203 and fastening contact tube 204 within contact tube holder 203; and (b) inserting collimator assembly 1000 into contact tube holder 203 such that distal end 1302 of lens 304 is positioned within a cavity 1301 (see FIG. 12 and FIG. 13) formed by contact tube holder 203 and fastening collimator assembly 1000 within contact tube holder 203.

In some embodiments, contact tube 204 is fastened within contact tube holder 203 merely by press fitting tube 204 into the distal open end of contact tube holder 203. As further shown, contact tube may be fastened such that its proximal end is located with a cavity defined by contact tube holder 203 and its distal end is positioned beyond the distal end of contact tube holder 203.

In some embodiments, collimator assembly 1000 is fastened within contact tube holder 203 by injecting an epoxy adhesive or other adhesive into the cavity formed contact tube holder 203 in which collimator 1000 is placed. To facilitate the injection of this adhesive, holes 1201 (see FIG. 12) may be formed in a wall of contact tube holder 203 that defines the cavity in which collimator 1000 is placed. In some embodiments, the adhesive used to fasten collimator 1000 within holder is a low shrinkage epoxy. Additionally, the epoxy may cure at room temperature or by exposure to ultraviolet light.

Figure 16:
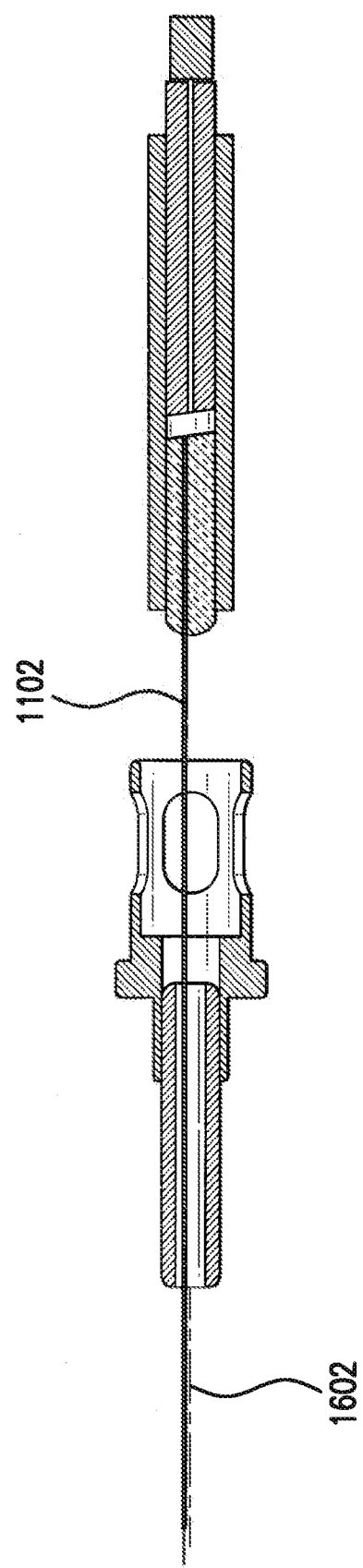
FIG. 16 illustrates an alignment between an optical axis of a collimator assembly and an axis of a contact tube.

After fastening contact tube 204 within contact tube holder 203 and inserting collimator 1000 into contact tube holder 203, but before fastening collimator 1000 within holder, there is a step of aligning the optical axis 1102 of collimator 1000 with an axis 1602 (see FIG. 16) of contact tube 204 (e.g., the centerline or longitudinal axis). This is illustrated in FIG. 16, which shows both the optical axis 1102 of collimator 1000 and the centerline axis 1602 of contact tube 204. In the example shown in FIG. 16, it can be seen that axis 1102 is not perfectly aligned with axis 1602 (i.e., the axis are parallel— there is not angular offset—but the axis 1102, 1602 are laterally offset by a small distance). In some embodiments, the alignment process includes adjusting the position of collimator 1000 within contact tube holder 203 until a light beam exiting lens 304 in the direction of contact tube 204 will pass through and exit contact tube 204 substantially unattenuated, that is, experiencing not more than a loss of about 2 dB (more preferably, in some embodiments, the insertion loss of the optical signal is less than about 1.5 dB, and in other embodiments a loss of not more than 1.2 dB may be achieved). A loss of not more than about 2 dB may be achieved by ensuring that the optical axis of collimator 1000 is substantially laterally and axially aligned with axis of 1602 of contact tube 204.

After the collimator 1000 is aligned with contact tube 104, an adhesive may be used to fasten collimator 1000 within contact tube holder 203 in the satisfactorily aligned position, as discussed above. Thus, once alignment is achieved, collimator 1000 should not be repositioned (or repositioned only very slightly). Accordingly, in some embodiments, a very low shrinkage and high strength adhesive is used to fasten collimator 1000 to contact tube holder 203 to help ensure that collimator 1000 will not move out of the aligned position.

Figure 14:
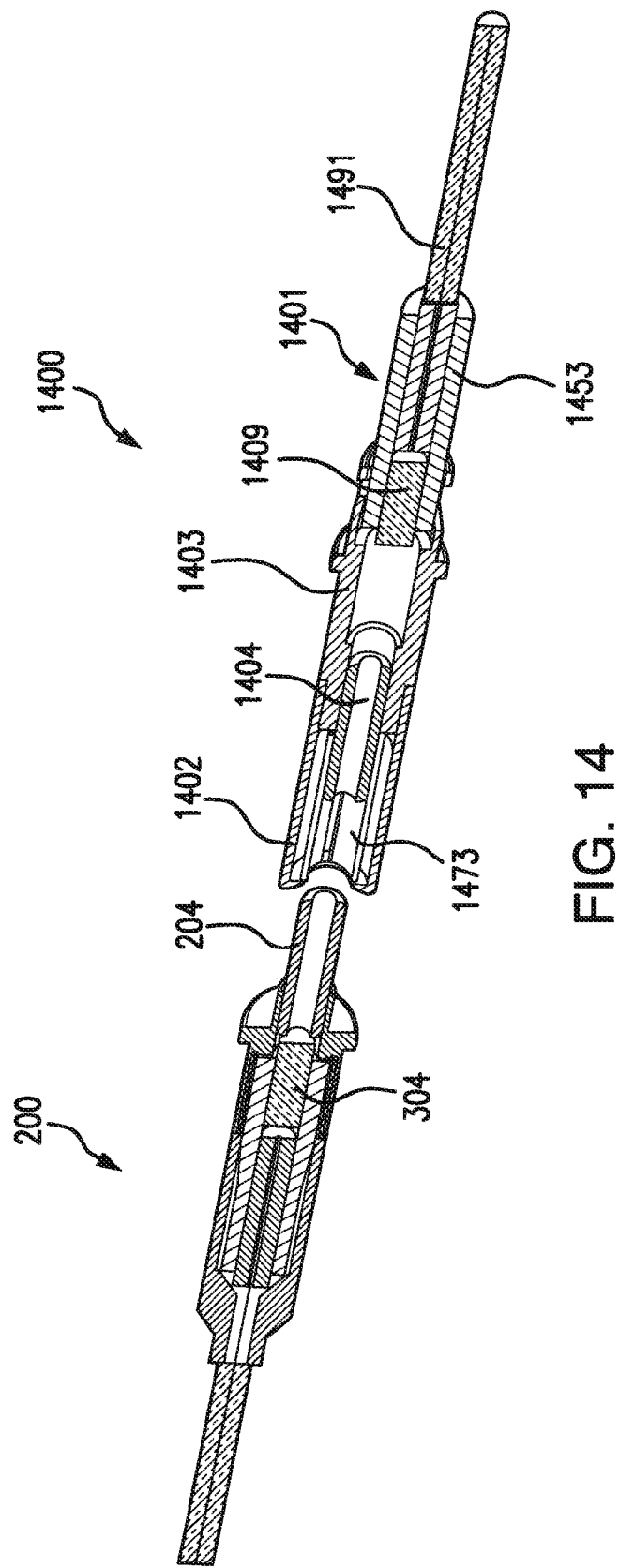
FIG. 14 illustrates the improved EB connector mating with female EB connector.

FIG. 14 illustrates the improved EB connector 200 mating with an improved female EB connector 1400.

In the example shown, EB connector 1400 is similar to EB connector 200. That is like, EB connector 200, EB connector 1400 includes a collimator assembly 1401 that is aligned with a contact tube 1404 and that includes a lens holder 1453 housing a lens 1409 and a fiber 1491. In some embodiments, collimator assembly 1401 may be identical to collimator assembly 1000. Unlinke EB connector 200, however, EB connector 1400 may include a cover tube 1402 for receiving contact tube 204 and an alignment sleeve 1473 (e.g., a split tube) for aligning contact tube 204 with the corresponding tube 1404 such that the centerline axis of each is aligned. Cover 1402 and alignment sleeve 1473 surround contact tube 1404.

Figure 15:
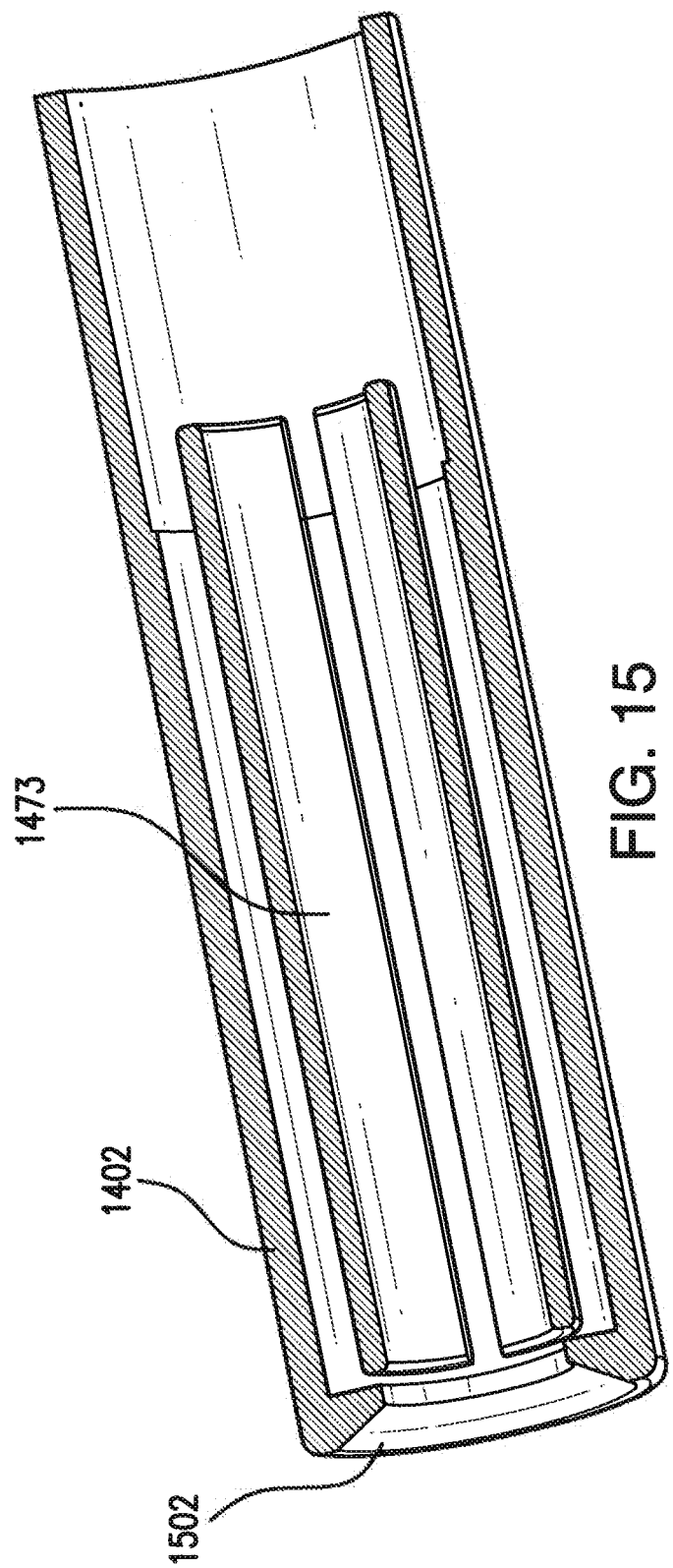
FIG. 15 illustrates a lead-in component of the female EB connector.

FIG. 15 is a further cross-sectional view of a portion of contact 1400, which figure further illustrates cover tube 1402 and alignment sleeve 1473 according to some embodiments. As shown in FIG. 15, cover tube 1402 may include a rim extending radially inward from the distal end of alignment sleeve 1402 defining a frustoconical lead-in 1502. As also shown, alignment sleeve 1473 is in the form of a split tube.

An advantage of EB connectors 200, 1400 is that the collimating lens (304, 1409) is protected from contamination because no portion of the lens is exposed.

EB connector 200 may be used in combination with a fiber optic jack, such as the fiber optic jack described in U.S. Patent Application Publication No. US 2010/0202730 ("the '730 publication"), which is incorporated by reference herein in its entirety. For example, EB connector 200 can be used in combination with the fiber optic jack 100 disclosed in the '730 publication just as fiber optic connectors 202/204 described in the '730 publication are used with the fiber optic jack.

While various embodiments of the present disclosure have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. An expanded beam (EB) optical connector, comprising:
   a rigid, hollow, straight contact tube having a centerline axis, said contact tube defining an empty space that extends the entire length of the contact tube; and
   a collimator assembly having an optical axis and comprising an optical fiber and a collimating lens, wherein
   the contact tube is not a lens holder,
   the centerline axis of the contact tube is at least substantially aligned with the optical axis such that collimated light produced by the lens from light exiting the fiber travels through the empty space defined by the contact tube and the loss of light caused by misalignment of the axes is not more than about 2 dB,
   the collimator assembly further comprises a lens holding tube open at both ends,
   at least a portion of the lens is housed within a first end portion of the lens holding tube,
   at least a portion of the optical fiber is housed within a second end portion of the lens holding tube,
   the EB optical connector further comprises a rigid, hollow contact tube holder having a first tubular end portion defining a first tubular cavity and a second tubular end portion defining a second tubular cavity,
   a first end of the contact tube is disposed within said first tubular cavity, and
   the first end portion of the lens holding tube is disposed within said second tubular cavity such that at least a portion of the lens is also disposed within said second tubular portion.

2. The EB optical connector of claim 1, wherein the lens is positioned between an end of the contact tube and an end of the optical fiber.

3. The EB optical connector of claim 1, wherein the loss of light caused by misalignment of the axes is not more than 1.5 dB.

4. The EB optical connector of claim 1, wherein the loss of light caused by misalignment of the axes is not more than 1.2 dB.

5. The EB optical connector of claim 1, wherein
   the lens is cylindrical in shape, and
   a proximal end of the lens is angled with respect to a transverse axis of the EB optical connector.

6. The EB optical connector of claim 1, wherein
   the lens is cylindrical in shape, and
   the outer diameter of the lens is greater than an inner diameter of said first end of the contact tube.

7. The EB optical connector of claim 1, wherein the contact tube is directly connected to the contact tube holder, and the connection was formed by press fitting the contact tube into the contact tube holder.

8. The EB optical connector of claim 1, where holes are formed in a wall of the second end portion of the contact tube holder.

9. An expanded beam (EB) optical connector, comprising:
   a rigid, hollow contact tube holder;
   a rigid, hollow contact tube having a first end attached to a first end portion of the contact tube holder, said contact tube defining an empty space that extends the entire length of the contact tube; and
   a collimator assembly comprising a lens, an optical fiber and a lens holder, wherein
   the contact tube is not a lens holder,
   at least a portion of the lens and at least a portion of optical fiber are housed in the lens holder,
   at least a portion of the lens holder is positioned in a cavity formed by a second end portion of the contact tube holder,
   the lens holder is adhesively fastened to the contact tube holder, and
   an optical axis of the collimator is aligned with an axis of the contact tube such that any collimated light produced by the lens from light exiting the fiber travels through the empty space defined by the contact tube.

10. The EB optical connector of claim 9, wherein the contact tube is integrally attached to the contact tube holder.

11. The EB optical connector of claim 9, wherein
    the first end of the contact tube has an outer diameter,
    the first end portion of the contact tube holder comprises a first open tube portion having an inner diameter,
    the inner diameter of the first open tube portion is greater than the outer diameter of the first end of the contact tube, and
    the first end of the contact tube is disposed within the first open tube portion of the contact tube holder.

12. The EB optical connector of claim 11, wherein
    the lens holder is in the form of an tube open at both ends, said lens holder having an outer diameter,
    the second end portion of the contact tube holder comprises a second open tube portion having an inner diameter, and
    a portion of the lens holder is disposed with the second open tube portion of the contact tube holder.

13. The EB optical connector of claim 9, wherein
    the lens is cylindrical in shape, and
    a proximal end of the lens is angled with respect to a transverse axis of the EB optical connector.

14. The EB optical connector of claim 9 wherein
    the lens is cylindrical in shape, and
    the outer diameter of the lens is greater than an inner diameter of the contact tube.

15. The EB optical connector of claim 9, wherein the contact tube is directly connected to the contact tube holder, and the connection was formed by press fitting the contact tube into the contact tube holder.

16. The EB optical connector of claim 9, where holes are formed in a wall of the second end portion of the contact tube holder.

* * * * *